(12) United States Patent
Raybold et al.

(10) Patent No.: US 8,409,427 B2
(45) Date of Patent: Apr. 2, 2013

(54) HYDROCARBON TREATMENT METHOD AND APPARATUS

(75) Inventors: Troy M. Raybold, Colden, NY (US); Raymond Francis Drnevich, Clarence Center, NY (US); Vasilis Papavassiliou, Williamsville, NY (US)

(73) Assignee: Praxair Technology, Inc., Danbury, CT (US)

( * ) Notice: Subject to any disclaimer, the term of this patent is extended or adjusted under 35 U.S.C. 154(b) by 911 days.

(21) Appl. No.: 12/535,051

(22) Filed: Aug. 4, 2009

(65) Prior Publication Data

US 2011/0034745 A1 Feb. 10, 2011

(51) Int. Cl.
*C07C 4/06* (2006.01)

(52) U.S. Cl. .......... 208/211; 208/208 R; 208/209; 208/212; 208/213; 208/216 R; 208/217; 208/49; 208/57; 208/58; 208/144; 208/145

(58) Field of Classification Search .......... 208/49, 208/57–58, 88–89, 144–145, 208 R, 209, 208/211, 213, 216 R, 217
See application file for complete search history.

(56) References Cited

U.S. PATENT DOCUMENTS

| 3,477,832 | A | 11/1969 | Mayland et al. |
| 7,037,485 | B1 | 5/2006 | Drnevich et al. |
| 7,547,422 | B2 | 6/2009 | Papavassiliou et al. |
| 2003/0094400 | A1 | 5/2003 | Levy et al. |
| 2004/0156778 | A1 | 8/2004 | Hwang et al. |
| 2008/0237090 | A1 | 10/2008 | Musich et al. |
| 2009/0013600 | A1 | 1/2009 | Drnevich et al. |
| 2009/0060807 | A1 | 3/2009 | Ripperger |

FOREIGN PATENT DOCUMENTS

| CN | 1200397 A | 12/1998 |
| WO | WO 2008/016361 A1 | 2/2008 |
| WO | WO 2009/020473 A1 | 2/2009 |

*Primary Examiner* — Brian McCaig
(74) *Attorney, Agent, or Firm* — Iurie A. Schwartz

(57) ABSTRACT

The present invention provides a method and apparatus for producing a treated hydrocarbon containing stream for use as a feed to a steam methane reformer of a hydrogen plant. In accordance with such method, amounts of olefins and organic sulfur species within an untreated feed are decreased in a reactor that is operated in either a hydrogenation mode to hydrogenate the olefins into saturated hydrocarbons or a pre-reforming mode in which hydrocarbon containing two or more carbon atoms including the olefins are reacted with oxygen and steam to form saturated hydrocarbons, methane, additional hydrogen and carbon monoxide. The reactor is configured and operates at a sufficiently high space velocity that olefin and organic species slip occurs that is further treated in a hydrotreater. The reactor contains a catalyst capable of promoting both hydrogenation and oxidation reactions and the hydrotreater contains a catalyst that is capable of only promoting hydrogenation reactions.

5 Claims, 1 Drawing Sheet

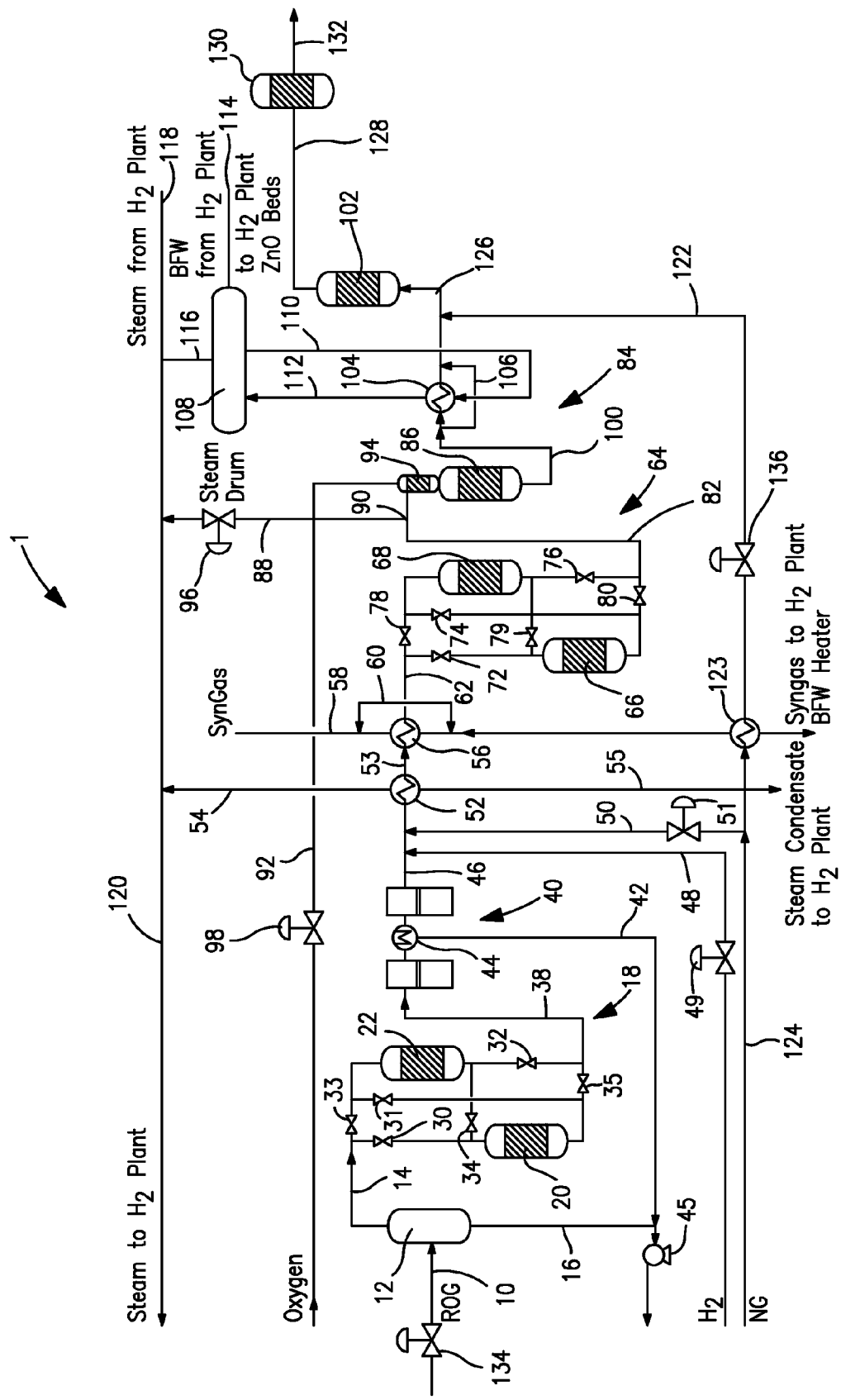

HYDROCARBON TREATMENT METHOD AND APPARATUS

FIELD OF THE INVENTION

The present invention relates to a method and reactor for treating an untreated hydrocarbon containing stream to produce a feed to a steam methane reformer of a hydrogen plant in which the amounts of olefins and organic sulfur species within the stream are decreased with the use of a sulfur tolerant catalyst capable of promoting hydrogenation and oxidation reactions. More particularly, the present invention relates to such a method and reactor in which a hydrotreater having a catalyst capable of solely promoting hydrogenation reactions is located downstream of a reactor containing the sulfur tolerant catalyst to hydrogenate olefin and organic sulfur species slip from the reactor.

BACKGROUND OF THE INVENTION

Hydrogen has many industrial uses that include the processing of sulfur containing crude oil within refineries to produce petroleum products. Hydrogen, itself, has more recently been considered as a possible substitute for petroleum fuels that are currently used in vehicles.

Hydrogen is commonly produced within hydrogen plants that have a steam methane reformer. Typically, natural gas is preheated and introduced into a hydrotreater containing a catalyst to reduce organic sulfur species into hydrogen sulfide and to a limited extent hydrogenate olefins into saturated hydrocarbons. The resulting treated feed is combined with superheated steam to produce a reactant stream fed to the steam methane reformer. As is well known in the art, the presence of sulfur containing compounds and a high olefin content within such a reactant stream will deactivate reforming catalyst within the steam methane reformer. Allowable levels of sulfur containing compounds and olefins within a reactant stream are commonly less than about 0.1 ppmv and less than 0.5 percent by volume, respectively, on a dry basis.

The reactant feed stream is then heated and fed to reformer tubes located within a furnace section of the steam methane reformer. Burners firing into the furnace section provide the heat necessary to support endothermic reforming reaction within the catalyst filled reformer tubes. The flue gas from the furnace section is then routed to a convective section of the reformer to preheat the reactant stream, to heat boiler feed water and to generate the superheated steam through indirect heat exchange occurring within heat exchangers located within the convective section. A reformed product discharged from the reforming tubes and containing hydrogen, carbon monoxide, steam, carbon dioxide, and methane is then cooled and processed within one or more water-gas shift reactors in which the steam is reacted with the carbon monoxide to increase the hydrogen concentration within the reformed product. The product hydrogen is then produced by cooling the hydrogen-rich stream from the water-gas shift reactor(s) and then separating the hydrogen in a pressure swing adsorption unit. The resulting tail gas is used, at least in part, as part of the fuel for the burners in the furnace section of the steam methane reformer.

A variety of off-gas streams are produced in refineries from processes such as fluidic catalytic cracking, coking, catalytic reforming and hydrocracking. These streams have a sufficiently high hydrocarbon and hydrogen content that they potentially could be reformed to produce a synthesis gas stream within the steam methane reformer. The problem with the use of such streams is that they have too high an organic sulfur species content and an olefin content to be directly utilized within a hydrogen plant by being passed through a conventional hydrotreater. While hydrogen plants have been designed with hydrotreaters capable of processing olefins, such hydrotreaters as a result can require recycle compressors and become much larger in volume and more difficult to operate in a reliable manner.

In order to overcome such limitations, U.S. Pat. No. 7,037,485 incorporates a reactor that utilizes a catalyst that is capable of promoting both hydrogenation and oxidation reactions. The reactor described in this patent is designed to process off-gas streams without a hydrotreater by hydrogenating the olefins into paraffins and reducing the organic sulfur species content to hydrogen sulfide. Alternatively, steam and oxygen can be introduced into reactor to produce saturated hydrocarbons, methane, carbon monoxide and hydrogen to increase the hydrogen output of the hydrogen plant. The limitation on the use of such a reactor is that it must operate at a sufficiently low space velocity to ensure that its product, either alone or after having been mixed with a desulfurized natural gas stream, contains no more than 0.1 ppmv of total sulfur (organic sulfur species and hydrogen sulfide) and less than 0.5 mol percent olefins, on a dry basis. In order to accommodate this limitation, the flow of the off-gas stream to be treated must be suitably limited or the reactor must be sufficiently sized to produce a sufficiently low concentration of total sulfur and olefins in the feed to the steam methane reformer.

As will be discussed, the present invention provides a method and apparatus that utilizes a sulfur tolerant catalyst, such as described above, that among other advantages, allows operations to be conducted at higher space velocities and therefore, permits the reactor to be more compact and less expensive and/or able to accommodate higher flow rates of hydrocarbon containing streams to be treated.

SUMMARY OF THE INVENTION

The present invention, in one aspect, provides a method of producing a treated hydrocarbon containing stream for use as a feed to a steam methane reformer of a hydrogen plant. In accordance with such method, an untreated hydrocarbon containing feed stream of variable composition comprising hydrocarbons that contain two or more carbon atoms including olefins, organic sulfur species and hydrogen is contacted with a sulfur tolerant catalyst contained within a reaction stage and capable of promoting both hydrogenation and oxidation reactions. Part of the olefins is converted into saturated hydrocarbons and part of the sulfur species is converted to hydrogen sulfide within the reaction stage, thereby to produce a first intermediate stream. The first intermediate stream is produced through hydrogenation reactions promoted by the catalyst or by introducing sufficient oxygen and steam into the reaction stage such that oxidation reactions are promoted by the catalyst resulting in saturated hydrocarbons, methane, additional hydrogen and carbon monoxide being produced from the hydrocarbons contained in the untreated hydrocarbon containing feed stream.

At least the first intermediate stream is introduced into a hydrotreater having another catalyst that is capable of solely promoting hydrogenation reactions and a second intermediate stream is thereby produced having a greater amount of the hydrogen sulfide than that of the first intermediate stream and lower amounts of the olefins and the organic sulfur species than that of the first intermediate stream by subjecting olefin and organic sulfur species slip in the first intermediate stream to hydrogenation reactions. The hydrogen sulfide is adsorbed from the second intermediate stream, thereby to produce the treated hydrocarbon containing stream.

The untreated hydrocarbon containing feed stream can be a refinery off-gas and can be compressed to a pressure greater than a preheated natural gas stream produced in the hydrogen plant. The first intermediate stream is combined with the preheated natural gas stream to produce a combined stream containing between about 0.5 mol percent and 6 mol percent by volume olefins on a dry basis and less than about 25 ppm by volume of total sulfur on a dry basis. In this regard, the term "total sulfur" as used herein and in the claims means both organic sulfur species and hydrogen sulfide. The combined stream is introduced into the hydrotreater, thereby to produce the second intermediate stream having no greater than about 0.5 mol percent of the olefins on a dry basis and of no greater than about 0.1 ppm by volume of the total organic sulfur on a dry basis.

The first intermediate stream can be passed through a boiler to generate saturated steam for the hydrogen plant and is thereby cooled to a temperature of between about 260° C. and about 480° C. prior to being combined with the preheated natural gas stream. Prior to the untreated hydrocarbon containing feed stream being introduced into the reaction stage, the untreated hydrocarbon containing feed stream, after compression, is: preheated to a temperature of about 230° C. through indirect heat exchange with steam generated in the hydrogen plant; preheated in a feed preheater through indirect heat exchange with a synthesis gas stream produced in the hydrogen plant to a temperature of between about 260° C. and about 400° C.; and thereafter, subjected to a pretreatment stage configured to remove incoming hydrogen sulfide from the untreated hydrocarbon containing feed stream.

Prior to and/or after the untreated hydrocarbon containing feed stream being compressed, the stream can be passed into a knockout drum to separate free liquids contained in the hydrocarbon containing stream and thereby to produce a condensate stream. Prior to or after the untreated hydrocarbon containing feed stream being compressed, sulfur containing compounds can be removed therefrom in a bulk sulfur removal stage.

In another aspect, the present invention provides an apparatus for producing a treated hydrocarbon containing stream for use as a feed to a steam methane reformer of a hydrogen plant. In accordance with this aspect of the present invention, the apparatus comprises a reactor configured to receive an untreated hydrocarbon containing feed stream of variable composition comprising hydrocarbons that contain two or more carbon atoms including olefins, organic sulfur species and hydrogen. The reactor contains a sulfur tolerant catalyst capable of promoting both hydrogenation and oxidation reactions contained within the reactor. The reactor is configured to convert part of the olefins into saturated hydrocarbons and at least part of the sulfur species to hydrogen sulfide, thereby to produce a first intermediate stream, through selective modes of operation. In a hydrogenation mode, hydrogenation reactions are promoted by the catalyst or in a pre-reforming mode, steam and oxygen are received within the reactor, oxidation reactions are promoted by the catalyst resulting in the saturated hydrocarbons, methane, additional hydrogen and carbon monoxide being produced from hydrocarbons contained in the untreated hydrocarbon containing feed stream.

A hydrotreater is provided in flow communication with the reactor so as to receive at least the first intermediate stream and to produce a second intermediate stream having a greater amount of the hydrogen sulfide than that of the first intermediate stream and lower amounts of the olefins and the organic sulfur species than that of the first intermediate stream through hydrogenation of olefin slip and conversion of organic sulfur species slip in the first intermediate stream with the use of another catalyst capable of solely promoting hydrogenation reactions. A zinc oxide bed associated with the hydrogen plant and connected to the hydrotreater is provided to adsorb the increased hydrogen sulfide content in the second intermediate stream, thereby to produce the treated hydrocarbon containing stream.

A mixer assembly can be provided in flow communication to the reactor and to conduits supplying the steam, the oxygen and the hydrocarbon containing feed stream such that a mixture containing the hydrocarbon containing feed stream, the steam and oxygen is received in the reactor and contacts the catalyst. Control valves are in flow communication with the conduits supplying the steam and oxygen to the mixer. The control valves are configured to be set in open positions to allow the oxygen and steam to be received within the reactor during the pre-reforming mode of operation.

A compressor can be provided to compress the untreated hydrocarbon containing feed stream to a pressure greater than a preheated natural gas stream produced in the hydrogen plant. A natural gas line is in flow communication with the hydrotreater so that the first intermediate stream is combined with the preheated natural gas stream to form a combined stream and the combined stream is introduced into the hydrotreater, thereby to produce the second intermediate stream. Further, a boiler can be positioned between the reactor and the hydrotreater such that the first intermediate stream is passed through the boiler to generate saturated steam for the hydrogen plant and is thereby cooled prior to being combined with the preheated natural gas stream. A preheater is connected to the compressor to preheat the untreated hydrocarbon containing feed stream through indirect heat exchange with steam generated in the hydrogen plant and a feed preheater is connected to the preheater to further preheat the untreated hydrocarbon containing feed stream through indirect heat exchange with a synthesis gas stream produced in the hydrogen plant. A pretreatment stage is positioned between the feed preheater and the reactor and is configured to remove incoming hydrogen sulfide from the untreated hydrocarbon containing feed stream. In addition, a knockout drum can be positioned upstream of each compressor stage and receives the untreated hydrocarbon containing feed stream, thereby to separate free liquids contained in the untreated hydrocarbon containing feed stream and to produce a condensate stream. A bulk sulfur removal stage is positioned between the knockout drum and the compressor or downstream of the compressor and is configured to remove sulfur containing compounds from the untreated hydrocarbon containing feed stream.

BRIEF DESCRIPTION OF THE DRAWING

While the specification concludes with claims distinctly pointing out the subject matter that Applicants regard as their invention, it is believed that the invention will be better understood when taken in connection with the accompanying sole FIGURE that illustrates a process flow diagram of an apparatus for carrying out a method in accordance with the present invention.

DETAILED DESCRIPTION

With reference to the FIGURE, an apparatus 1 for carrying out a method in accordance with the present invention is illustrated. Apparatus 1 is designed to be used in connection with a hydrogen plant that has a steam methane reformer, as described above, either as an original installation or as a retrofit to an existing installation. In this regard, although apparatus 1 is shown in connection with treating an untreated hydrocarbon containing feed stream 10 that can be a refinery off-gas stream, other streams having a sufficiently high olefin content and sulfur content that reforming catalyst could be damaged or deactivated could also be treated in apparatus 1. For example, the present invention would have equal applicability to an untreated hydrocarbon containing feed stream that constitutes an off-gas from steel making, chemical waste streams and streams containing by-products of gasification. It is to be noted that in case of refinery off-gas streams, as well as other streams, there could be some degree of pretreatment prior to apparatus 1 by removal of hydrogen sulfide if present in appreciable amounts.

Untreated hydrocarbon containing feed stream 10 can, however, comprise a refinery off-gas stream that typically has the compositions set forth in the Table set forth below.

|  |  | Gas Composition (mole fraction %) | | |
|---|---|---|---|---|
|  |  | FCC off-gas | Coker off-gas | Sweet Refinery off-gas |
| Hydrogen | mol % | 10.8 | 26.97 | 17.2 |
| Methane | mol % | 37.7 | 52.8 | 42.1 |
| Ethylene | mol % | 15.9 | 0.6 | 9.8 |
| Ethane | mol % | 15.5 | 8.9 | 19.55 |
| Propylene | mol % | 2.84 | 0.9 | 3.8 |
| Propane | mol % | 1.65 | 3.8 | 1.2 |
| Isobutane | mol % | 0.68 | 0.5 | 0.5 |
| Butane | mol % | 0.20 | 1.3 | 0.1 |
| 1-Butene | mol % | 0.15 | 0.2 | 0.1 |
| 1,3-Butadiene | mol % | 0.01 | 0.2 | 0.19 |
| Isopentane | mol % | 0.28 | 0.3 | 0.5 |
| Pentane | mol % | 0.84 | 0.4 | 0.06 |
| 1-Pentene | mol % | 0 | 0.1 | 0 |
| Hexane+ | mol % | 0 | 0.9 | 0 |
| Nitrogen | mol % | 9 | 0 | 0 |
| Oxygen | mol % | 0.02 | 0 | 0 |
| Carbon Monoxide | mol % | 2.15 | 2.1 | 3.3 |
| Carbon Dioxide | mol % | 2.28 | 0.03 | 1.6 |
| Total |  | 100 | 100 | 100 |

The makeup of these gases can, however, vary with respect to hydrocarbon content and content of sulfur species. Although not illustrated in the Table, the sulfur content of such streams may range from between about 5 ppmv and about 200 ppmv on a dry basis and is typically divided between mercaptans, thiophenes and hydrogen sulfide. Such streams must be treated to decrease the amounts of olefins and the sulfur compounds such that the reforming catalyst in the steam methane reformer will not be deactivated by carbon and sulfur deposition. As indicated above, a typical specification for a feed to the steam methane reformer is less than about 0.5 mol percent olefins on a dry basis and less than about 0.1 ppmv total sulfur (organic species and hydrogen sulfide) on a dry basis.

When untreated hydrocarbon containing feed stream 10 is a refinery off-gas stream, it typically will have to be pretreated by removal of free liquids, and then sulfur containing substances. This is done by introducing the untreated hydrocarbon containing feed stream 10 into a knockout drum 12 to produce a saturated untreated hydrocarbon containing stream 14 and a condensate stream 16. Saturated untreated, hydrocarbon containing stream 14 is then introduced into a bulk desulfurization unit 18 having bulk sulfur removal beds 20 and 22 containing a consumable iron oxide adsorbent. Operation of the sulfur removal beds 20 and 22 is controlled by valves 30-35 to produce a sulfur lean untreated hydrocarbon containing stream 38. This operation is a lead-lag type of operation in which the saturated untreated hydrocarbon containing stream 14 is first fed to bulk sulfur removal bed 20 and then bulk sulfur removal bed 22. To such end, valves 30, 31 and 32 are set in open positions and valves 33, 34 and 35 are set in closed positions. Bulk sulfur removal bed 20 will need to be replaced first since it is first receiving the sulfur containing, saturated untreated hydrocarbon containing stream 14. After replacement, valves 33, 34 and 35 are set in open positions and valves 30, 31 and 32 are set in closed positions so that bulk sulfur removal bed 22 is fed before bulk sulfur removal bed 20.

The sulfur lean untreated hydrocarbon containing stream 38 is then introduced into a compressor 40 that can be a multiple-stage, intercooled, reciprocating compressor that produces a condensate stream 42 as a result of the removal of the heat of compression between stages by an intercooler 44 that employs water as a coolant and a knockout drum to separate the water. In this regard, condensate stream 42 can be combined with condensate stream 16 and then pumped by a pump 45 back to the refinery employing the hydrogen plant. As could be appreciated by those skilled in the art, the knockout drum 12 and bulk desulfurization unit 18 could be located downstream of the compressor 40.

The resulting compressed, untreated hydrocarbon containing stream 46 can optionally be combined with supplemental hydrogen or natural gas by way of hydrogen and natural gas streams 48 and 50, respectively. Control valves 49 and 51 are provided to meter the hydrogen and the natural gas streams 48 and 50, respectively. Here, it is to be noted that natural gas addition can moderate peaks in the amount of the total sulfur or peaks in the amount of the olefins within a reactor 84, to be described hereinafter, that can lead to excessive exit temperatures in reactor 84. The hydrogen addition can also compensate for a low hydrogen content within untreated hydrocarbon containing stream 10 that would otherwise prevent hydrogenation of the olefins. As can be appreciated, embodiments of the present invention are possible without such hydrogen and natural gas addition.

Whether or not natural gas or hydrogen is added, the compressed untreated hydrocarbon containing stream 46 is then introduced into a steam preheater 52 in which such stream is preheated through indirect heat exchange with a steam stream 54 from the hydrogen plant to a temperature of about 232° C. The indirect heat exchange results in the condensation of steam stream 54 that can be returned as a stream 55 to a known blow down drum, not illustrated, employed in the hydrogen plant. This preheating is necessary for startup of the reactor 84 during the hydrogenation mode and can be valuable on an ongoing basis for the pre-reforming mode of operation in order to decrease oxygen requirements. The compressed, untreated hydrocarbon containing stream 53 is passed from preheater 52 to a product heater 56 in which such stream is heated through indirect heat exchange with the synthesis gas stream 58 from the hydrogen plant's water-gas shift reactor to a temperature of between about 260° C. and about 400° C. A by-pass line 60 can be provided to control temperatures of the resulting preheated, untreated hydrocarbon containing feed stream 62. This temperature control is necessary in that the preheated, untreated hydrocarbon containing feed stream 62 is then introduced into a secondary desulfurization bed unit 64, containing consumable zinc oxide beds of adsorbent located within adsorbent beds 66 and 68 to adsorb most of the hydrogen sulfide, but also some smaller amounts of COS, mercaptans, sulfides and disulfides. On average the total sulfur will be reduced to about 10 and about 20 ppmv on a dry basis with the residual sulfur dominated by heavier organic sulfur species, such as thiophenes.

The operation of adsorbent beds 66 and 68 is controlled by valves 72-80, inclusive to produce a partly treated, hydrocarbon containing feed stream 82 that is fed into a reactor 84. The same type of lead-lag operation that is used in bulk sulfur removal unit 18 is employed and as such, valves 72, 74 and 76 are set in open positions and valves 78, 79 and 80 are set in closed positions so that the flow is first fed to adsorbent bed 66 and then adsorbent bed 68. After replacement of adsorbent bed 66 with a fresh adsorbent bed, adsorbent bed 68 will be fed first and then adsorbent bed 66. For such purposes, valves 78, 79 and 80 are set in open positions and valves 72, 74 and 76 are set in closed positions.

Although not illustrated, where a refinery off-gas is being treated, the untreated stream might also be passed over guard adsorbents designed to remove trace impurities, such as metals, chlorides and/or silica. Such impurities may need to be removed to protect downstream catalysts and/or adsorbents. Depending on the type and amount of such impurities, guard adsorbent-loaded vessels could be located downstream of bulk sulfur removal unit 18, compressor 40, steam preheater 52, or product heater 56. Guard adsorbent may be loaded into a single vessel or into two vessels arranged in a lead-lad configuration. In certain instances, more than one type of guard adsorbent may be needed, possibly loaded in separate vessels. It may be sufficient to add a layer of guard adsorbent to the inlet of adsorbent beds 66 and 68. Finally, instead of using a specialized guard adsorbent, the volume of catalyst or adsorbent impacted by the trace impurity might simply be increased to compensate for gradual deactivation.

It is to be noted that apparatus 1 is specifically designed to allow treatment of an untreated hydrocarbon containing feed stream 10 that constitutes an off-gas of the type that would be generated in a refinery installation. As such, if a hydrocarbon containing feed stream were available at pressure and with a sufficiently low amount of sulfur, it could be utilized within a reactor in accordance with the present invention without knock-out drum 12, bulk sulfur removal unit 18, compressor 40 and the secondary desulfurization unit 64.

Reactor 84 has a reactor vessel 86 that contains a catalyst that is capable of promoting hydrogenation and oxidation reactions and as such reactor 84 is capable of operating in either of a hydrogenation mode or a pre-reforming mode. In the hydrogenation mode, hydrogenation reactions are exploited to hydrogenate the olefins that are contained in the untreated hydrocarbon containing feed stream 10 into saturated hydrocarbons. In the pre-reforming mode, the oxidation capability of the catalyst is exploited through the introduction of oxygen and steam into reactor vessel 86 to convert such hydrocarbons into saturated hydrocarbons, methane, additional hydrogen and carbon monoxide. In either of such modes, the organic sulfur species are at least partly converted to hydrogen sulfide. The pre-reforming mode of operation would be carried out where it was desired to make additional hydrogen. Such mode could also be carried out when there is not sufficient hydrogen within the hydrocarbon containing feed stream 10 for the hydrogenation mode to be carried out.

The catalyst employed within reactor 84 is preferably a metallic monolith coated with a catalytic layer that contains platinum, rhodium, palladium, nickel or ruthenium. The structure of the monolith can be reticulated foam, honeycomb or a corrugated foil wound in a spiral configuration. Catalyst coated beads or ceramic monoliths in the form of a reticulated foam or honeycomb structure are other possibilities. It is believed that the metallic supported catalyst has better performance than other supported catalyst in that it has better heat conductivity, a more uniform temperature profile than other catalyst forms and a lower operating temperature. All of these factors permit the more selective destruction of olefins. A useful catalyst can be obtained from Sud-Chemie of Louisville, Ky., USA, which is in the form of a monolith which is sold as PC-POX 1 on FeCrAlY.

The oxygen and steam are added by combining a steam stream 88 with partly treated, hydrocarbon containing feed stream 82 by way of conduits that are connected by a junction 90. The resulting combined stream is then combined with an oxygen stream 92 introduced into a mixer 94 by an oxygen conduit. Alternatively, all or part of the steam could be added to oxygen stream 92 (not shown.). Mixer 94, as known in the art, would be a vessel having a mixing section that includes a mixing chamber having an inlet for the hydrocarbon containing gas, an oxygen injector located within the mixing chamber for injecting the oxygen into the hydrocarbon containing gas. A packing located below the oxygen injector that permits mixing in both radial and axial directions of said mixing chamber. For example, mixer 94 packing could be formed from a ceramic material like Koch-Glitsch FLEXERAMIC® structured packing constructed of corrugated sheets of ceramic. The angle of inclination of the corrugations of adjacent sheets is reversed with respect to the vertical column axis, forming mixing cells at every point where the corrugations intersect. This promotes intimate mixing and radial distribution of the gas stream. Alternatively the packing can be a metallic sponge material such as can be obtained from Porvair Advanced Materials at 700 Shepherd Street, Hendersonville, N.C., USA. Such materials have a very open structure and relatively small pore sizes from between about 10 and about 100 pores per 6.45 square centimeter, with pores that have diameters of less than 1 mm. Preferably, the material should have about 80 pores per 6.45 square centimeter and a pore diameter of about 0.25 mm. The material selected can be a high nickel alloy such as Inconel 600 or Hastelloy C-276. The metallic sponge material will impart a flow pattern that is both radial and axial to help promote mixing in such directions. In addition to the foregoing, such a ceramic or metallic packing material would advantageously function as a flame arrestor to prevent the formation of a stable flame prior to completion of the mixing of the oxygen and hydrocarbons. A static mixer can be added after the packing material to further promote mixing. In this regard, such a mixer is illustrated U.S. Pat. No. 7,547,422 that is employed in a catalytic reactor. Although no particular form of a reactor is preferred, reactor 84 could take the form illustrated in the foregoing patent. As could be appreciated, the combined stream could be introduced directly into the reactor and the oxygen stream 92 could be separately introduced into the reactor without the use of the mixer 94. However, for reasons obvious to those skilled in the art, this would not be a preferred mode in carrying out the present invention in that better results are obtained with the use of mixer 94 and the resulting blended feed to reactor vessel 86.

The steam addition and the oxygen addition are controlled by control valves 96 and 98, respectively, that are both set in open positions to initiate operation in the pre-reforming mode. The molar ratios of steam and oxygen relative to the partially treated hydrocarbon containing feed will be adjusted by such valves to be less than about 1.0 and 0.2, respectively. This being said, during the hydrogenation mode, some steam may have to be added to prevent carbon deposition on the catalyst within reactor vessel 86 and if for some reason, preheating is unavailable, then oxygen can also be added to combust the hydrocarbons and thereby produce temperatures within reactor vessel 86 that are necessary to initiate the hydrogenation reactions. In this regard, embodiments of the present invention are therefore possible that do not utilize steam preheater 52 and product heater 56. Such embodiments would depend upon oxygen addition for functioning in the hydrogenation mode. In the hydrogenation mode, reactor exit temperatures will typically vary between 427° C. and 704° C., depending on the amount of the olefins contained within the untreated hydrocarbon containing feed stream 10. Excessive exit temperatures are avoided by addition of diluent steam by way of steam stream 88 or natural gas by way of natural gas stream 50. In the oxidation mode, oxygen flow is manipulated by control valve 98 to maintain a constant reactor exit temperature of between about 649° C. and 816° C.

The resulting first intermediate stream 100 produced by reactor 84 can maintain the amount of the olefins at a target value by addition of supplemental hydrogen by way of hydrogen stream 48, or by way of oxygen addition by way of oxygen stream 92. In the hydrogenation mode, steam addition by way of stream 88 and/or natural gas addition by way of stream 50 can be used to control the exit temperature of reactor 84 as the temperature approaches 704° C. During the pre-reforming mode, natural gas addition can be used to dilute the hydrogen concentration within the reactor 84 to drive equilibrium toward additional hydrogen production. Although not mentioned above, the untreated hydrocarbon containing feed stream 10 may contain saturated hydrocarbons with more than two carbon atoms in addition to the olefins that possibly present a carbon deposition hazard to the reforming catalyst within the steam methane reformer. The pre-reforming mode will normally be effective to reduce such hydrocarbons to smaller chain hydrocarbons. However, this is not an object of the present invention and in fact, it is possible for the steam methane reformer to incorporate an alkalized, supported nickel catalyst that will be tolerant of such long chain hydrocarbons.

During either of the hydrogenation mode or the pre-reforming modes of operation, the first intermediate stream 100 will still contain olefins and residual organic sulfur in addition to hydrogen sulfide produced through reduction of the organic sulfur. Further reduction of the amount of the olefins and the organic sulfur takes place in a hydrotreater 102 that can be an existing unit in case of a retrofit situation. Thus, both olefin slip and organic sulfur species slip occurs during operation of reactor 84 and such incomplete processing will allow an operation of reactor 84 at a higher space velocity than that contemplated in the prior art. An even greater olefin and organic sulfur species slip can be tolerated if the first intermediate stream 100 is blended with natural gas. The result of such blending will be to reduce the concentrations by volume of the olefins and the organic sulfur species to be further processed in hydrotreater 102. Typically, reactor 84 will operate at a space velocity of above 40,000 hours$^{-1}$ based on the catalyst volume within reactor vessel 86.

Prior to being further treated within hydrotreater 102, the first intermediate stream 100 is cooled within a boiler 104 to between about 316° C. and about 427° C. against generation of saturated steam. The boiler 104 has an internal bypass 106 at the cold end of the tube-side and is constructed in the same manner as a process gas boiler employed in a hydrogen plant. A steam drum 108 circulates a boiler feed water stream 110 to boiler 104 to generate saturated steam in stream 112 that is recirculated back to steam drum 108. Makeup boiler feed water 114 for the steam drum 108 is obtained from the boiler feed water heater employed in the hydrogen plant. It is to be noted that under most conditions, the boiler 104 produces sufficient steam as a steam stream 116 for use in preheater 52 and for reactor 84. During startup, superheated or saturated steam will be imported from the hydrogen plant as a steam stream 118 to form steam streams 54 and 88. Excess steam, as a steam stream 120 is returned to the hydrogen plant steam drum or steam separator vessel prior to being superheated in the convective section of the steam methane reformer.

In the integration contemplated for apparatus 1, the first intermediate stream 100 after having been cooled within boiler 104 is combined with a natural gas stream 122. Natural gas stream 122 and natural gas stream 50 are produced from a natural gas stream 124 from the battery limits of the hydrogen plant. Natural gas stream 124 is preheated in a preheater 123 through indirect heat exchange with the synthesis gas stream 58 after passage through product heater 56. Here it is to be noted that the compressor 40 should be operated to maintain a discharge pressure such that the pressure of the first intermediate stream 100 has sufficiently greater pressure than the preheated natural gas stream 122, between about 10 and about 50 psi to prevent backflow. Reactor 84 should be operated such that the resulting combined stream 126 contains between 0.5 and 6 dry mol percent olefins and less than 25 ppmv on a dry basis of total sulfur. However, it is to be noted that integrations are possible in which the entire feed to the hydrotreater 102 is derived from untreated hydrocarbon containing feed stream 10. The natural gas, however, while containing some organic sulfur, typically, 5 ppm by volume on a dry basis and typically no olefins will dilute the first intermediate stream 100 to be within such limits. Thus, the reactor 84 can be operated such that the first intermediate stream 100 has an even higher concentration of olefins and sulfur than that given above and such operation can entail higher space velocities than those contemplated in the prior art.

The combined stream 126 is fed to the existing hydrotreater 102, charged with NiMo catalyst that is only capable of hydrogenation reactions. The hydrotreater 102 will further hydrogenate the olefins to saturated hydrocarbons and convert residual organic sulfur species to hydrogen sulfide contained in first intermediate stream and preheated natural gas stream to produce a second intermediate stream 128 in which the olefins and the total organic sulfur are present at less than about 0.5 dry mol percent and 0.1 ppmv on a dry basis, respectively. The amount of the hydrogen sulfide has been increased due to the conversion of the organic sulfur species within the hydrotreater 102 to hydrogen sulfide. If the first intermediate stream 100 were the sole feed to the hydrotreater 102 then the reactor 84 would be operated to produce a sufficient destruction of the olefins and the organic species that the hydrotreater 102 were capable of processing such stream to produce the second intermediate stream with olefins and total organic sulfur present in the limits discussed above. The second intermediate stream 128 is in turn fed to a zinc oxide bed 130, that can also be a pre-existing bed in a hydrogen plant, to adsorb the hydrogen sulfide and thereby to produce the treated hydrocarbon containing stream 132 that will be fed to the steam methane reformer along with superheated stream for steam methane reforming.

To avoid operational problems in hydrotreater 102 and the downstream zinc oxide adsorbent bed units, operation of the reactor 84 may need to be constrained, particularly during oxidation mode. For example, to avoid methanation over the NiMo hydrotreating catalyst within hydrotreater 102, the combined feed 126 should contain less than 10 mol percent of carbon monoxide. If the combined feed contains less than 2 ppmv dry total sulfur, the carbon monoxide should be further reduced to 6 mol percent or less. In all cases, presulfided NiMo is the most preferred hydrotreater catalyst charge.

CoMo catalyst is less efficient at saturating olefins and has a greater tendency to methanate $CO_x$ species. While in-situ NiMo sulfiding is a possibility, the amount of olefins or $CO_x$ which can be tolerated by the process will be limited until the catalyst is fully sulfided.

To avoid underperformance of the zinc oxide adsorbent within zinc oxide adsorbent bed 130, due to equilibrium constraints, the second intermediate stream 128 should be at least about 28° C. over the dew point and contain no more than 30 mol percent water. Depending upon the adsorbent and operating temperature, equilibrium constraints may dictate an even lower acceptable water concentration. If equilibrium constraints become an issue and a sufficiently low moisture concentration cannot be achieved, a Cu-promoted ZnO polishing adsorbent layer may need to be added to the desulfurization vessels containing the zinc oxide adsorbent.

Finally, existing metallurgy downstream of the reactor 84 may constrain the tolerable partial pressure of hydrogen. For instance, to avoid hydrogen embrittlement in existing carbon steel vessels or piping, the partial pressure of the hydrogen within the first intermediate stream 100 should be less than 100 psia.

The potentially high operational space velocities contemplated by the present invention will reduce the amount of catalyst required or will allow an increase in the flow of untreated hydrocarbon containing feed stream 10 able to be processed within apparatus 1 over that contemplated in the prior art. For example, in a hydrogen plant having a production capacity of about 100 MMSCFD hydrogen and a contemplated processing of about 3200 mscfh of refinery off-gas in reactor 84, an increase in the space velocity from 40,000 hours$^{-1}$ to 160,000 hours$^{-1}$ would result in reduction of the amount of catalyst required and a cost savings of about 75 percent. Although processing is shifted to the hydrotreater 102, the catalyst cost by unit volume of a conventional NiMo catalyst used in a hydrotreater is roughly 3 percent of the cost of the catalyst within the reactor 84.

For example, assuming about 50 percent of the feed to a hydrogen plant will be derived from a refinery off-gas containing about 16 dry mol percent total olefins and 30 dry mol percent hydrogen and the remainder will be natural gas and operation of the reactor 84 in the hydrogenation mode, at a space velocity of 160,000 hours$^{-1}$, the olefin slip will be about 6.4 dry mol percent olefins. After blending with NG, the remaining 3.2 mol percent total olefins could be handled in the hydrotreater 102 employing conventional NiMo catalyst. In such case, the roughly about 75 percent less catalyst would be required in the reactor 84 over the prior art in which all of the processing of the olefins took place at a lower space velocity and within a single reactor having the same catalyst as reactor 84. In addition, the hydrotreater 102 provides limited backup to the reactor 84 for conversion of olefins and organic sulfur species when needed. In this regard, the apparatus 1 is therefore, better able to handle variations in the concentrations of the olefins and organic sulfur species within the untreated hydrocarbon containing feed stream 10.

As illustrated and discussed above, apparatus 1 is employed in connection with an existing hydrogen plant which requires a portion of its natural gas feedstock to be replaced with an olefin-containing refinery-off gas. The design of such a retrofit would be based upon some maximum refinery off-gas usage rate, for example, 825 mscfh for a 100 MMSCFD hydrogen production rate. Depending on the availability and/or value of refinery off-gas, as well as on the desired hydrogen production rate of the existing hydrogen plant, actual refinery off-gas usage, at any given time, may range from 0 to 825 mscfh. For example, the plant may be started and brought to maximum hydrogen production rates using only the natural gas feed. Once stable, control valve 134 may be gradually opened, such that flow gradually increases to 825 mscfh. Concurrently, the natural gas feed control valve 136 would be gradually closed, so that the hydrogen plant production rate remained constant at 100 MMSCFD. For reasonably consistent refinery off-gas compositions, conventional volumetric flow control may suffice. However, as refinery off-gas compositions can be quite variable, it may be more advantageous and stable to control upon the calorific flow rate of the untreated hydrocarbon containing feed stream 10 determined by multiplying the volumetric flow of untreated hydrocarbon containing feed stream 10 and the heating value thereof. For instance, a calorimeter, not illustrated, could continuously monitor the heating value of untreated hydrocarbon containing feed stream 10. This value could be used to modify the set point of control valve 134, such that the product of the measured heating value and flow would always equal some target value. No matter how such flow is controlled, the control valve 136 would be manipulated to ensure a target hydrogen production rate of the hydrogen plant.

The amount of the olefins, sulfur and hydrogen could be monitored for one or more streams, possibly including streams designated by reference number 10, 38, 62, 82, 100, 126, 128 and/or 132. Reasonably fast or continuous analysis would be desirable. Analyzers could include mass spectrometer(s), gas chromatograph(s), so-called fast gas chromatograph(s) and/or various types of commercial sulfur analyzers. Analyzer measurements would be available as an input for various control loops. For instance, if the untreated hydrocarbon containing feed stream 10 had an amount of hydrogen that was not in a sufficient stoichiometric excess over the amount of the total olefins, reactor 84 in hydrogenation mode and/or hydrotreater 102 may not adequately reduce olefin content. This hydrogen deficiency can be quantified and programmed to induce the hydrogen control valve 49 to open according to a predetermined algorithm. If the hydrogen deficiency is large enough, beyond yet another preset value, the pre-reforming mode start sequence for the reactor 84 could be initiated. Of course, all the while, the natural gas control valve 136 could be manipulated to compensate and keep the hydrogen production of the hydrogen plant constant. In another example, if the olefin concentration of the untreated hydrocarbon containing stream 10 results in reactor 84 exit temperatures approaching 704° C., a portion of the natural gas stream 124 or steam 88 can be used to dilute the incoming feed. This could be programmed in a control system that would act to induce natural gas control valve 51 or steam control valve 96 to open according to a predetermined algorithm. The shunted natural gas stream 50 or steam stream 88 would dilute the untreated stream and reduce the olefin content to within permissible levels. As an alternative, if hydrogen is in excess of that needed for hydrogenation, the exit temperature of first intermediate stream 100 could be a proxy for olefin content during operation of this control loop in hydrogenation mode.

While the present invention has been described with reference to a preferred embodiment, as will occur to those skilled in the art, numerous changes, additions and omissions can be made without departing from the spirit and scope of the present invention as set forth in the appended claims.

We claim:

1. A method of producing a treated hydrocarbon containing stream for use as a feed to a hydrogen plant having a steam methane reformer, said method comprising:

contacting an untreated hydrocarbon containing feed stream of variable composition comprising hydrocarbons that contain two or more carbon atoms including olefins, organic sulfur species and hydrogen with a sulfur tolerant catalyst contained within a reaction stage and capable of promoting both hydrogenation and oxidation reactions, wherein the untreated hydrocarbon containing feed stream is a refinery off-gas that is compressed to a pressure greater than a preheated natural gas stream produced in the hydrogen plant;

converting part of the olefins into saturated hydrocarbons and part of the sulfur species to hydrogen sulfide within the reaction stage, thereby to produce a first intermediate stream, through hydrogenation reactions promoted by the catalyst or by introducing sufficient oxygen and steam into the reaction stage such that oxidation reactions are promoted by the catalyst resulting in the saturated hydrocarbons, methane, additional hydrogen and carbon monoxide being produced from the hydrocarbons contained in the untreated hydrocarbon containing feed stream, combining the first intermediate stream with the preheated natural gas stream to produce a combined stream containing between about 0.5 mol percent and 6 mol percent olefins on a dry basis and less than about 25 ppm by volume of total sulfur on a dry basis;

the first intermediate stream is passed through a boiler to generate saturated steam for the hydrogen plant and is thereby cooled to a temperature of between about 260° C. and about 480° C. prior to being combined with the preheated natural gas stream;

prior to the hydrocarbon containing feed stream being introduced into the reaction stage, the untreated hydrocarbon containing feed stream, after compression, is: preheated to a temperature of about 230° C. through indirect heat exchange with steam generated in the hydrogen plant; preheated in a feed preheater through indirect heat exchange with a synthesis gas stream produced in the hydrogen plant to a temperature of between about 260° C. and about 400° C.; and thereafter, subjected to a pretreatment stage configured to remove incoming hydrogen sulfide from the untreated hydrocarbon containing feed stream;

introducing at least the first intermediate treated hydrocarbon containing feed stream into a hydrotreater having another catalyst that is capable of solely promoting hydrogenation reactions and producing a second intermediate stream containing no greater than about 0.5 mol percent of the olefins on a dry basis and no greater than about 0.1 ppm by volume organic sulfur on a dry basis, and having a greater amount of the hydrogen sulfide than that of the first intermediate stream and lower amounts of the olefins and the organic sulfur species than that of the first intermediate stream by subjecting olefin and organic sulfur species slip in the first intermediate stream to hydrogenation reactions; and adsorbing the hydrogen sulfide in the second intermediate stream, thereby to produce the treated hydrocarbon containing stream.

2. The method of claim 1, wherein:
prior to or after being compressed, the untreated hydrocarbon containing feed stream is passed into a knockout drum to separate free liquids in the hydrocarbon containing stream and thereby to produce a condensate stream; and
prior to or after the untreated hydrocarbon containing feed stream being compressed, sulfur containing compounds are removed therefrom in a bulk sulfur removal stage.

3. The method of claim 1, further comprising:
processing the untreated hydrocarbon containing feed in the space velocity from 40,000 hours$^{-1}$ to 160,000 hours$^{-1}$ to reduce of the amount of catalyst required.

4. An apparatus for producing a treated hydrocarbon containing stream for use as a feed to a hydrogen plant having a steam methane reformer reactant stream to be reformed in a hydrogen plant containing a steam methane reformer, said apparatus comprising:

a reactor configured to receive an untreated hydrocarbon containing feed stream of variable composition comprising hydrocarbons that contain two or more carbon atoms including olefins, organic sulfur species and hydrogen and containing a sulfur tolerant catalyst capable of promoting both hydrogenation and oxidation reactions contained within the reactor;

the reactor also configured to convert part of the olefins into saturated hydrocarbons and at least part of the sulfur species to hydrogen sulfide, thereby to produce a first intermediate stream, through selective modes of operation such that in a hydrogenation mode, hydrogenation reactions are promoted by the catalyst or in a pre-reforming mode, steam and oxygen are received within the reactor, oxidation reactions are promoted by the catalyst resulting in production of saturated hydrocarbons, methane, additional hydrogen and carbon monoxide from hydrocarbons contained in the untreated hydrocarbon containing feed stream;

a mixer assembly is in flow communication to the reactor and conduits supplying the steam, the oxygen and the hydrocarbon containing feed stream such that a mixture containing the hydrocarbon containing feed stream, the steam and oxygen is received in the reactor and contacts the catalyst; and control valves are in flow communications with the conduits supplying the steam and oxygen to the mixer, the control valves configured to be set in open positions to allow the oxygen and steam to be received within the reactor during the pre-reforming mode of operation;

a hydrotreater in flow communication with the reactor so as to receive at least the first intermediate treated hydrocarbon containing stream and to produce a second intermediate stream having a greater amount of the hydrogen sulfide than that of the first intermediate stream and lower amounts of the olefins and the organic sulfur species than that of the first intermediate stream through hydrogenation of olefin slip and conversion of the organic sulfur species slip in the first intermediate stream with the use of another catalyst capable of solely promoting hydrogenation reactions;

a compressor compresses the untreated hydrocarbon containing feed stream to a pressure greater than a preheated natural gas stream produced in the hydrogen plant;and a natural gas line is in flow communication with the hydrotreater so that the first intermediate stream is combined with the preheated natural gas stream to form a combined stream and the combined stream is introduced into the hydrotreater, thereby to produce the second intermediate stream;

a boiler is positioned between the reactor and the hydrotreater such that the first intermediate stream is passed through a boiler to generate saturated steam for the hydrogen plant and is thereby cooled prior to being combined with the preheated natural gas stream; and a preheater is connected to the compressor to preheat the untreated hydrocarbon containing feed stream through indirect heat exchange with steam generated in the hydrogen plant;

a feed preheater is connected to the preheater to further preheat the untreated hydrocarbon containing feed stream through indirect heat exchange with a synthesis gas stream produced in the hydrogen plant; and a pretreatment stage is positioned between the feed preheater and the reactor and is configured to remove incoming hydrogen sulfide from the untreated hydrocarbon containing feed stream; and a zinc oxide bed associated with the hydrogen plant and connected to the hydrotreater to adsorb the increased hydrogen sulfide content in the second intermediate stream, thereby to produce the treated hydrocarbon containing stream.

5. The apparatus of claim 4, wherein:

a knockout drum is positioned upstream of each compressor stage and receives the untreated hydrocarbon containing feed stream, thereby to separate free liquids in the untreated hydrocarbon containing feed stream and to produce a condensate stream; and a bulk sulfur removal stage is positioned between the knockout drum and the compressor or downstream of the compressor and is configured to remove sulfur containing compounds from the untreated hydrocarbon containing feed stream.

* * * * *